United States Patent
Yuki et al.

(10) Patent No.: US 9,502,076 B2
(45) Date of Patent: Nov. 22, 2016

(54) CUE POINT CONTROL APPARATUS AND RECORDING MEDIUM THAT FACILITATE SEARCH OF CUE POINT DURING PLAYBACK

(71) Applicant: Kyocera Document Solutions Inc., Osaka (JP)

(72) Inventors: Akira Yuki, Osaka (JP); Kyota Mitsuyama, Osaka (JP); Ayaka Ikejima, Osaka (JP); Wataru Endo, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 14/658,252

(22) Filed: Mar. 16, 2015

(65) Prior Publication Data

US 2015/0262618 A1    Sep. 17, 2015

(30) Foreign Application Priority Data

Mar. 17, 2014    (JP) .................. 2014-053679

(51) Int. Cl.

| H04N 9/80 | (2006.01) |
|---|---|
| G11B 27/28 | (2006.01) |
| G11B 27/10 | (2006.01) |
| G11B 27/34 | (2006.01) |
| H04N 5/77 | (2006.01) |
| H04N 9/82 | (2006.01) |
| G06K 9/00 | (2006.01) |

(52) U.S. Cl.
CPC ........... *G11B 27/28* (2013.01); *G06K 9/00355* (2013.01); *G11B 27/105* (2013.01); *G11B 27/34* (2013.01); *H04N 5/77* (2013.01); *H04N 9/8205* (2013.01)

(58) Field of Classification Search
CPC ...... H04N 7/181; H04N 5/772; H04N 7/185; H04N 21/4223; H04N 21/44218
See application file for complete search history.

(56) References Cited

U.S. PATENT DOCUMENTS

| 2005/0185053 A1* | 8/2005 | Berkey ............ G08B 13/19602 348/155 |
|---|---|---|
| 2009/0208184 A1* | 8/2009 | Takahashi ............ G11B 27/105 386/248 |
| 2011/0235994 A1* | 9/2011 | Xu ........................ G11B 27/034 386/241 |

FOREIGN PATENT DOCUMENTS

| JP | 2002-374527 A | 12/2002 |
|---|---|---|
| JP | 2004-187043 A | 7/2004 |
| JP | 2004-343154 A | 12/2004 |
| JP | 2008-124702 A | 5/2008 |
| JP | 2008-234798 A | 10/2008 |
| JP | 2011-070368 A | 4/2011 |
| JP | 2012-065170 A | 3/2012 |

* cited by examiner

*Primary Examiner* — Huy T Nguyen

(74) *Attorney, Agent, or Firm* — James Judge

(57) ABSTRACT

A cue point control apparatus used for capturing a display apparatus includes a control unit and a motion detecting unit. The control unit sets a marker while capturing, as a moving image, a presentation performed with displaying an image on a screen of the display apparatus. The motion detecting unit detects a motion of a user performing the presentation. When the control unit determines a set first motion of the user for the marker setting by the detected motion, the control unit sets a temporal marker in a frame of the moving image at a time when determining the first motion during the capturing.

8 Claims, 7 Drawing Sheets

CUE POINT CONTROL APPARATUS AND RECORDING MEDIUM THAT FACILITATE SEARCH OF CUE POINT DURING PLAYBACK

INCORPORATION BY REFERENCE

This application is based upon, and claims the benefit of priority from, corresponding Japanese Patent Application No. 2014-053679 filed in the Japan Patent Office on Mar. 17, 2014, the entire contents of which are incorporated herein by reference.

BACKGROUND

Unless otherwise indicated herein, the description in this section is not prior art to the claims in this application and is not admitted to be prior art by inclusion in this section.

When users make a presentation to an audience, the presentation has been recorded for the purposes of a future review of presentation content. A cue point for a function of a cue during playback is typically provided in order to enhance the efficiency of reviewing moving image data recorded for drawing up minutes and editing of the moving image. Note that the cue point as used herein indicates a marker that represents a specified time point in the moving image.

When using a typical moving image editing software or similar software, the users have been setting the cue point at a required position while playing back the recorded moving image data to confirm the content.

This method requires the time and labor to set the cue point while playing back after recording. Therefore, to save this time and labor, for example, techniques such as described below have been developed.

This technique is to save the time and labor required for the setting of the cue point while playing back by setting the cue point during recording. Unfortunately, it was probable that the recording had already proceeded ahead when a person responsible for setting the cue point detected a scene that was required for setting as the cue point during recording. Therefore, this technique sets the cue point at the earlier time point by a specified time than the time point of provided instruction for the cue point, which is set by the person responsible for setting the cue point, so as to solve the problem.

SUMMARY

A cue point control apparatus according to an aspect of the disclosure is used for capturing a display apparatus. The cue point control apparatus includes a control unit and a motion detecting unit. The control unit sets a marker while capturing, as a moving image, a presentation performed with displaying an image on a screen of the display apparatus. The motion detecting unit detects a motion of a user performing the presentation. When the control unit determines a set first motion of the user for the marker setting by the detected motion, the control unit sets a temporal marker in a frame of the moving image at a time when determining the first motion during the capturing.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1:
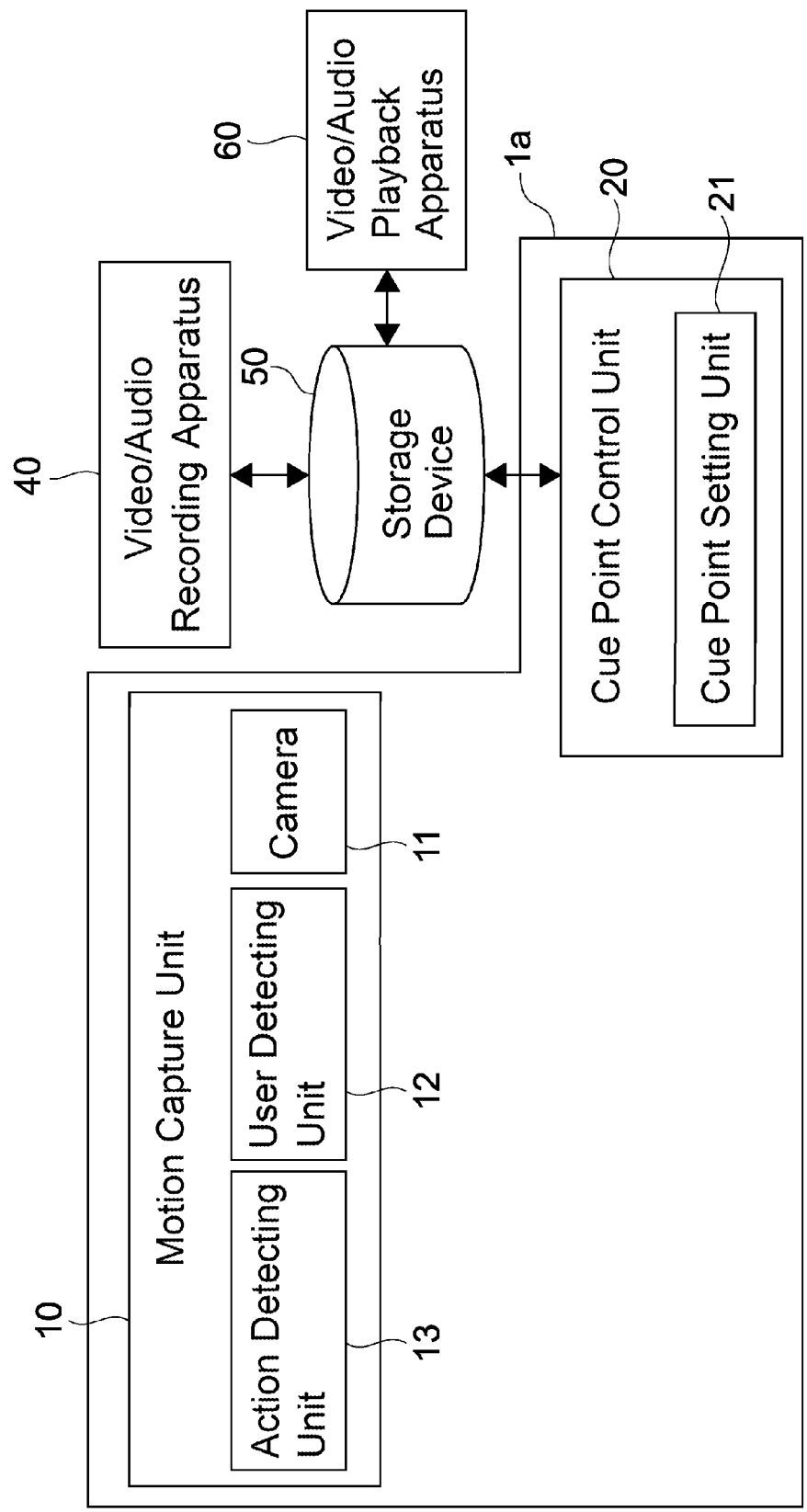
FIG. 1 illustrates a configuration of a cue point control apparatus according to a first embodiment of the disclosure.

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

Hereafter, a description will be given of the embodiments of the disclosure with reference to the attached drawings. In a following first embodiment, a cue point control apparatus that enables a cue point to be set without having any equipment during recording will be described. In a second embodiment, a cue point control apparatus that enables the cue point to be set at the earlier time by a time instructed by a user will be described. In a third embodiment, a cue point control apparatus that enables a coordinate on a two-dimensional space to be employed as a spatial cue point will be described. In a fourth embodiment, a cue point control apparatus that enables the desired cue point to be easily found out during playback of a moving image will be described.

Outline of First Embodiment

First, an outline of the first embodiment will now be described.

A user may capture and record a presentation, which is performed while displaying an image on a screen of a display apparatus, for future purposes of drawing up minutes or editing of the moving image. In such cases as where an audience asks a question during the presentation, the user as a speaker interrupts the presentation for discussing the question with the audience. In this case, since the user has difficulty in making notes in detail of the discussion, this causes the user to check the moving image captured for a future review of the discussion.

For a quick cue to a position of initiation of the discussion when reviewing the moving image, the cue point may be set in a frame of the initiation of the discussion in the moving image.

In the first embodiment, use of a sensor for a motion capture ensures: to detect a user's specific action as a gesture of setting the cue point in the moving image during capturing, and to set the cue point in the position desired by the user.

For example, when the audience asks a question during the presentation, the user may provide instruction for setting the cue point with respect to the cue point control apparatus by performing such as the action of raising his or her right hand.

Up to this point, the outline of the first embodiment has been described.

Configuration of First Embodiment

Next, a configuration of the cue point control apparatus according to the first embodiment will be described. FIG. 1 illustrates the configuration of the cue point control apparatus according to the first embodiment.

A cue point control apparatus 1a according to the first embodiment includes a motion capture unit 10 (motion detecting unit) and a cue point control unit 20.

The cue point control apparatus 1a is used in conjunction with a video/audio recording apparatus 40 for capturing the moving image, a storage device 50 for storing moving image data of the captured moving image, and a video/audio playback apparatus 60 for acquiring the moving image data from the storage device 50 to play back. The video/audio recording apparatus 40, the storage device 50, and the video/audio playback apparatus 60 may employ typical general-purpose products and no additional description will be provided.

The cue point control apparatus 1a may be also constituted with typical computers such as a personal computer (PC).

The motion capture unit 10 includes a camera 11, a user detecting unit 12, and an action detecting unit 13.

The camera 11 captures the image of the user who makes a presentation and a surrounding area of the user.

The user detecting unit 12 identifies the user who makes the presentation by the image captured by the camera 11.

The action detecting unit 13 detects (extracts and determines) the user's specific motion identified by the user detecting unit 12.

The motion capture unit 10 includes such as the camera 11 as described above. However, it is not limited to the above configuration. Each of the camera 11, the user detecting unit 12, and the action detecting unit 13 may also be constituted independently of one another. The sensor for the motion capture that is commercially available, typical, and inexpensive may also be employed by being each constituted independently.

The cue point control unit 20 includes a cue point setting unit 21. Upon detection of the user's action for instructing the cue point setting by the motion capture unit 10, the cue point setting unit 21 sets the cue point in the frame of the moving image stored in the storage device 50 by the video/audio recording apparatus 40 according to the timing of the detection.

Up to this point, the configuration of the cue point control apparatus 1a according to the first embodiment has been described.

Flow of Processes in First Embodiment

Figure 2:
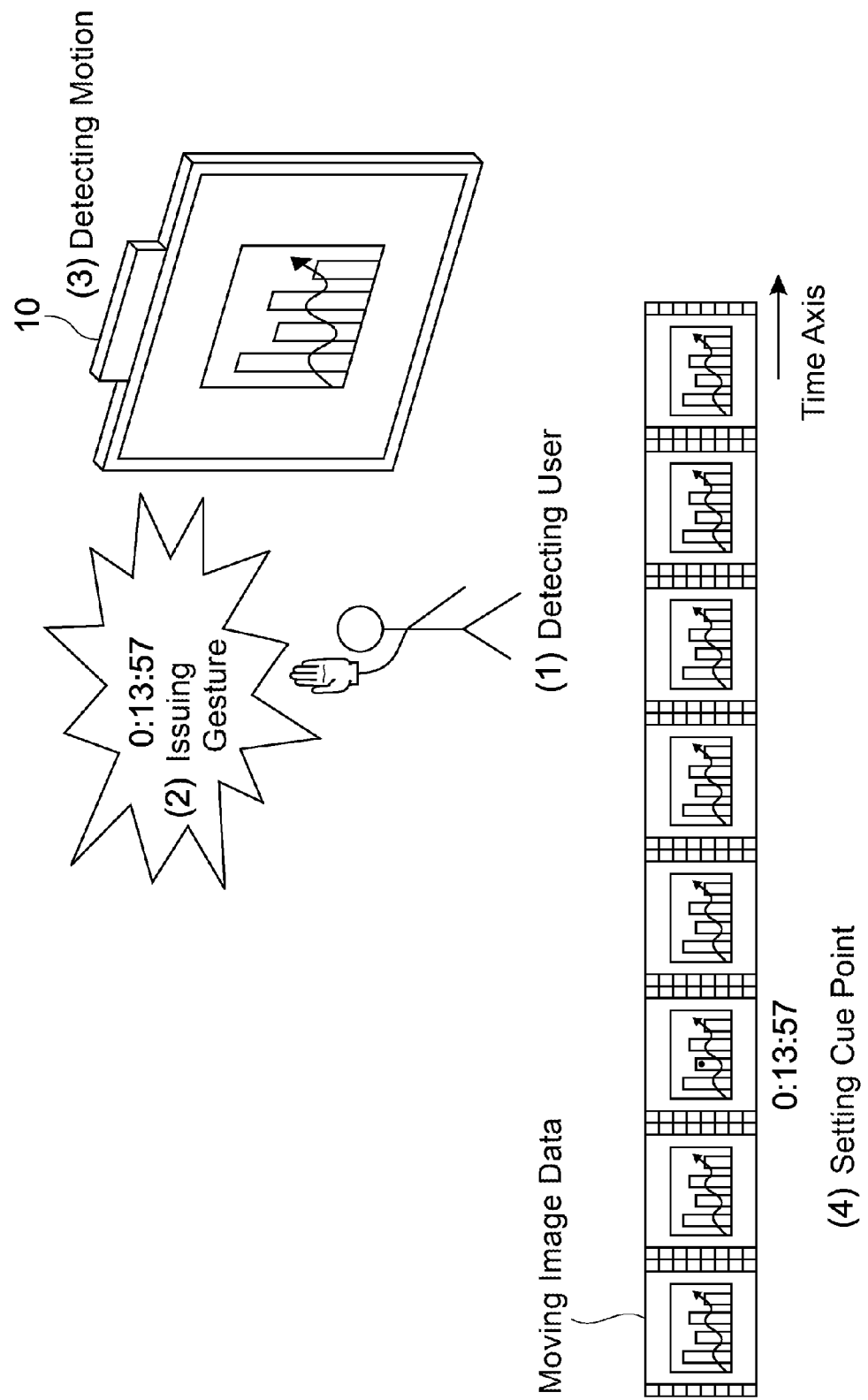
FIG. 2 illustrates a flow of processes for a cue point setting in the cue point control apparatus according to the first embodiment.

Next, a flow of processes for the cue point setting in the cue point control apparatus 1a according to the first embodiment will be described. FIG. 2 illustrates the flow of the processes for the cue point setting in the cue point control apparatus 1a according to the first embodiment.

(1) First, the motion capture unit 10 detects the user of the speaker for the presentation. Detecting the user enables the user's action to be detected.

(2) Next, the user makes (issues) a gesture (first motion) for setting the cue point in the moving image during capturing. In an example as illustrated in FIG. 2, the gesture is issued at the time point when an elapsed time after the start of recording is 13 minutes 57 seconds.

(3) Next, the motion capture unit 10 detects the action performed by the user.

(4) Next, upon detection of the user's action for instructing the cue point setting by the motion capture unit 10, the cue point setting unit 21 sets the cue point in the frame of the moving image stored in the storage device 50 by the video/audio recording apparatus 40 according to the timing of the detection. In the example as illustrated in FIG. 2, the cue point is set in the frame at the time point when the elapsed time after the start of recording is 13 minutes 57 seconds.

Up to this point, the flow of the processes for the cue point setting in the cue point control apparatus 1a according to the first embodiment has been described.

The cue point is set in the frame of the moving image as described above. However, it is not limited to the above configuration. This may be configured such that the cue point setting unit 21 is made to be able to measure the elapsed time after the start of capturing to store the elapsed time at the time point when instructing the cue point setting in a table, and store the table in conjunction with the captured moving image.

Outline of Second Embodiment

In the first embodiment, the cue point is set in the frame captured at the point when the user performs the specific action. In contrast, in the second embodiment, the user sets the cue point in the frame at the time point (going backward by a specified time to the past from the time point when the action is performed) by the specific action.

For example, assume that the user forgets to make the gesture at the time point in which the user desires to set the cue point. In this case, the user raises his or her right hand with raising his or her index finger alone when the user recalls the cue point setting after 10 seconds passes from the time point desired to be set.

Consequently, the cue point is set in the frame at 10 seconds earlier time point than that of when the hand rises.

Configuration of the Second Embodiment

Next, a configuration of the cue point control apparatus according to the second embodiment will be described. The configuration of the cue point control apparatus according to the second embodiment is basically similar to the configuration of the cue point control apparatus 1a as illustrated in FIG. 1, and no block diagram will be described.

However, some functions of the action detecting unit 13 and the cue point setting unit 21 are added.

In addition to the functions as described in the first embodiment, the action detecting unit 13 detects the user's instruction for the required time (going backward in time) when setting the cue point in the frame at the time point before the user provides instruction.

In addition to the functions as described in the first embodiment, the cue point setting unit 21 sets the cue point in the frame at the time point (going backward in time) by the specified time from the time point detected the instruction for setting the cue point with going backward in time.

Up to this point, the configuration of the cue point control apparatus according to the second embodiment has been described.

Flow of Processes in Second Embodiment

Figure 3:
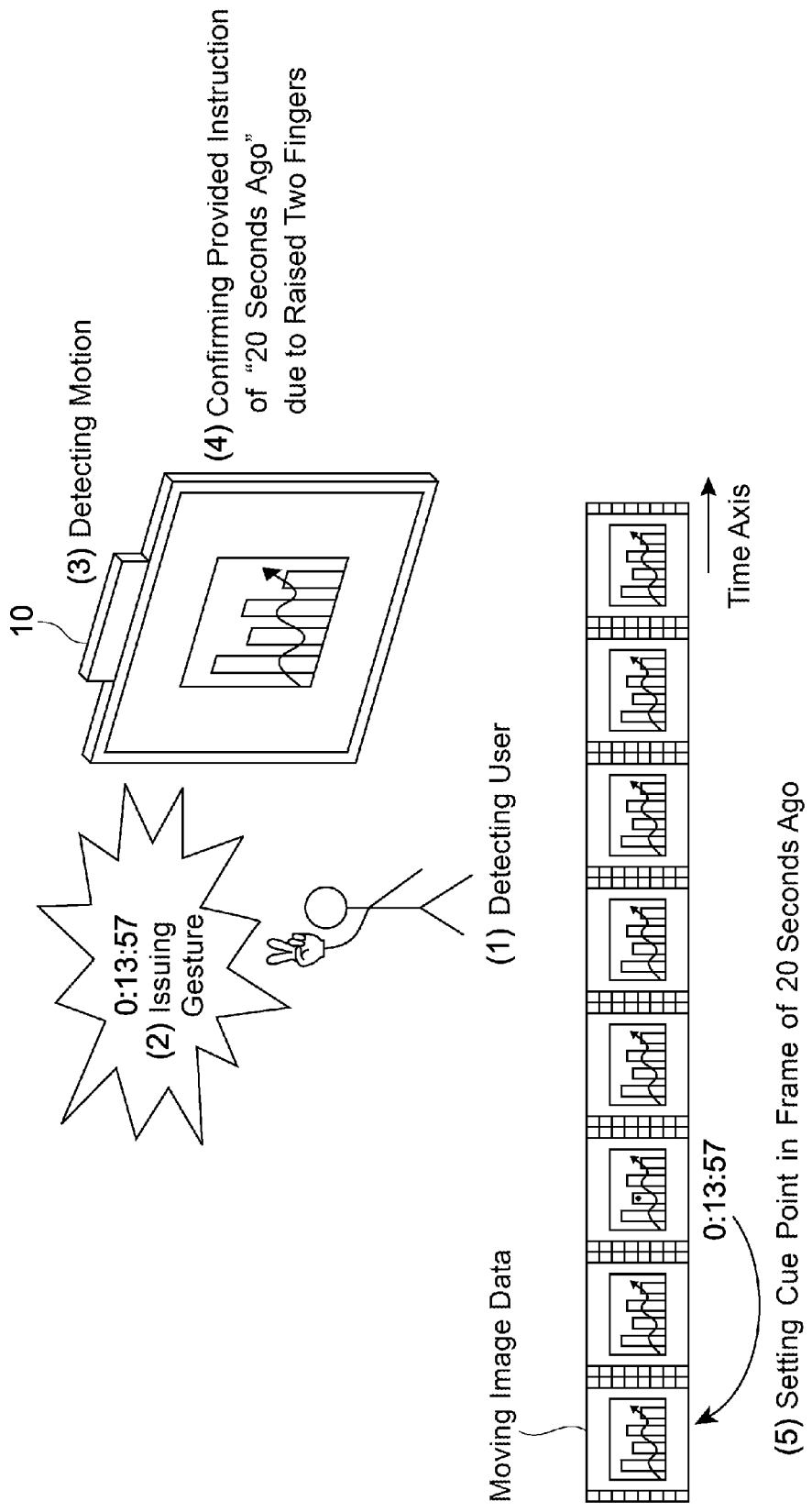
FIG. 3 illustrates a flow of processes for a cue point setting in a cue point control apparatus according to a second embodiment of the disclosure.

Next, a flow of processes for the cue point setting in the cue point control apparatus according to the second embodiment will be described. FIG. 3 illustrates the flow of the processes for the cue point setting in the cue point control apparatus according to the second embodiment.

(1) First, the motion capture unit 10 detects the user as the speaker for the presentation.

(2) Next, the user makes (issues) the gesture (second motion) for going backward in time by the specified time and setting the cue point in the moving image during capturing. In an example as illustrated in FIG. 3, the gesture is issued at the time point when an elapsed time after the start of recording is 13 minutes 57 seconds. Additionally, FIG. 3 illustrates the example where a gesture of raising every finger is defined as going backward 10 seconds. The user raises the two fingers with making a V-sign by his or her hand, thus defining as going backward in time by 20 seconds.

(3) Next, the motion capture unit 10 detects the action performed by the user.

(4) Next, the action detecting unit 13 detects the provided instruction of "20 seconds ago" because the user's two fingers are raised.

(5) Next, the cue point setting unit 21 sets the cue point in the frame at the time point (going backward in time in the time axis) by just 20 seconds from the frame of the moving image stored in the storage device 50 by the video/audio recording apparatus 40 according to the timing of the user's action being detected. In the example as illustrated in FIG. 3, the cue point is set in the frame at the time point when the elapsed time after the start of recording is 13 minutes 37 seconds.

Up to this point, the flow of the processes for the cue point setting in the cue point control apparatus according to the second embodiment has been described.

Outline of Third Embodiment

Next, an outline of the cue point control apparatus according to the third embodiment will be described. In addition to an above-described temporal cue point, the cue point control apparatus according to the third embodiment enables the image used for the presentation by the user to be employed as the two-dimensional space, and enables the coordinate on the two-dimensional space to be employed as the spatial cue point.

For example, when the user makes the presentation using a bar chart illustrating annual sales, the spatial cue point may be set in the position where the user gives an explanation with pointing to the bar chart of the sales for the previous year. Here, when the user performs the action of pointing to the screen (third motion), a pointing device that detects the action to move a cursor to be displayed on the screen is employed.

Upon the user performing the action for instructing the cue point setting, the cue point control apparatus stores the coordinate on the screen pointed by the user at that time point, in conjunction with the cue point.

The stored coordinate is used for the cue during playback of the moving image with employing the image as the spatial cue point.

Here, the cue point control apparatus handles both the temporal cue point and the spatial cue point. However, it is not limited to the above configuration, and the cue point control apparatus may handle the only spatial cue point.

Up to this point, the outline of the cue point control apparatus according to the third embodiment has been described.

Configuration of Third Embodiment

Figure 4:
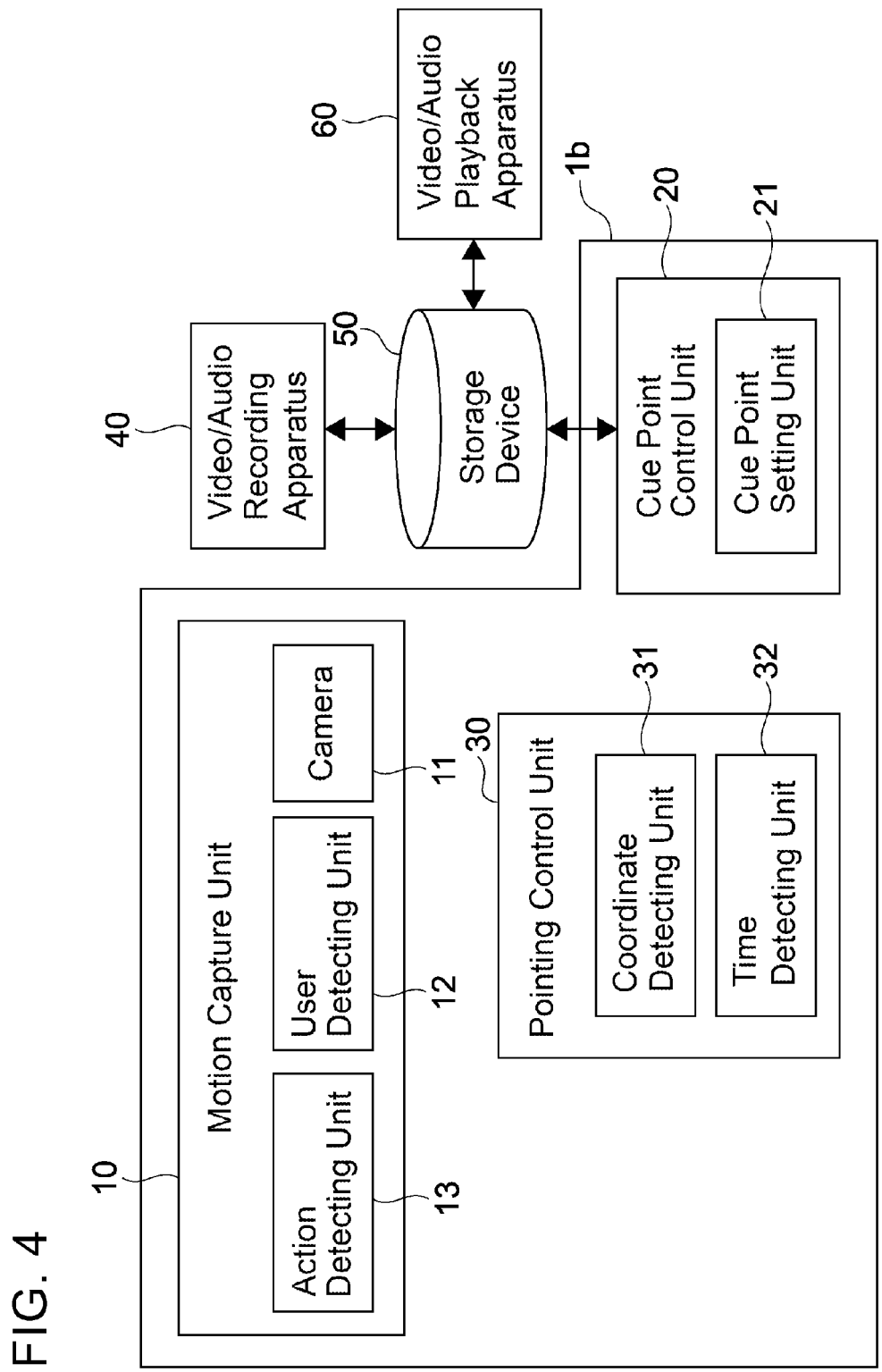
FIG. 4 illustrates a configuration of a cue point control apparatus according to a third embodiment of the disclosure.

Next, a configuration of the cue point control apparatus according to the third embodiment will be described. FIG. 4 illustrates the configuration of a cue point control apparatus 1b according to the third embodiment.

The cue point control apparatus 1b includes the motion capture unit 10, the cue point control unit 20, and a pointing control unit 30. The pointing control unit 30 may be the apparatus that is independent of the cue point control apparatus 1b.

In the following description, the only different description from the first embodiment or the second embodiment as described above will be provided.

Although not illustrated here, the user employs the display apparatus for displaying the image used for the presentation. Accordingly, the configuration is defined as that the motion of the user pointing to the screen of the display apparatus causes the cursor on the screen to move.

The action detecting unit 13 detects (searches and determines) the user's specific motion identified by the user detecting unit 12. For example, in addition to the motion for setting the cue point, the user points to the image displayed on the screen of the display apparatus with the finger. And then, moving the hand while pointing causes the action detecting unit 13 to extract the motion of the finger to move the cursor displayed on the screen of the display apparatus.

For example, as the user moves his or her hand pointing to the screen to the right side, the cursor on the screen correspondingly moves to the right side. Thus, the user can instruct the cursor movement without anything in hands. The action detecting unit 13 does not detect an absolute position of the user's hand pointing to the screen, but detects a relative position where the hand moves, so as to move the cursor on the screen.

The pointing control unit 30 includes a coordinate detecting unit 31 and a time detecting unit 32.

The coordinate detecting unit 31 acquires the coordinate (namely, coordinate at the cursor locating position on the screen) at the position on the screen of the display apparatus pointed by the user at the time point when the user provides instruction for the cue point setting.

The time detecting unit 32 detects a recording elapsed time at the time point when the user provides instruction for the cue point setting. The recording elapsed time may be also referred to as a frame number of the moving image after the time point of the start of recording.

The cue point setting unit 21 correlates the coordinate acquired by the coordinate detecting unit 31 with the elapsed time (frame number) detected by the time detecting unit 32 to store in conjunction with the moving image being captured.

Up to this point, the configuration of the cue point control apparatus 1b according to the third embodiment has been described.

Flow of Processes in Third Embodiment

Figure 5:
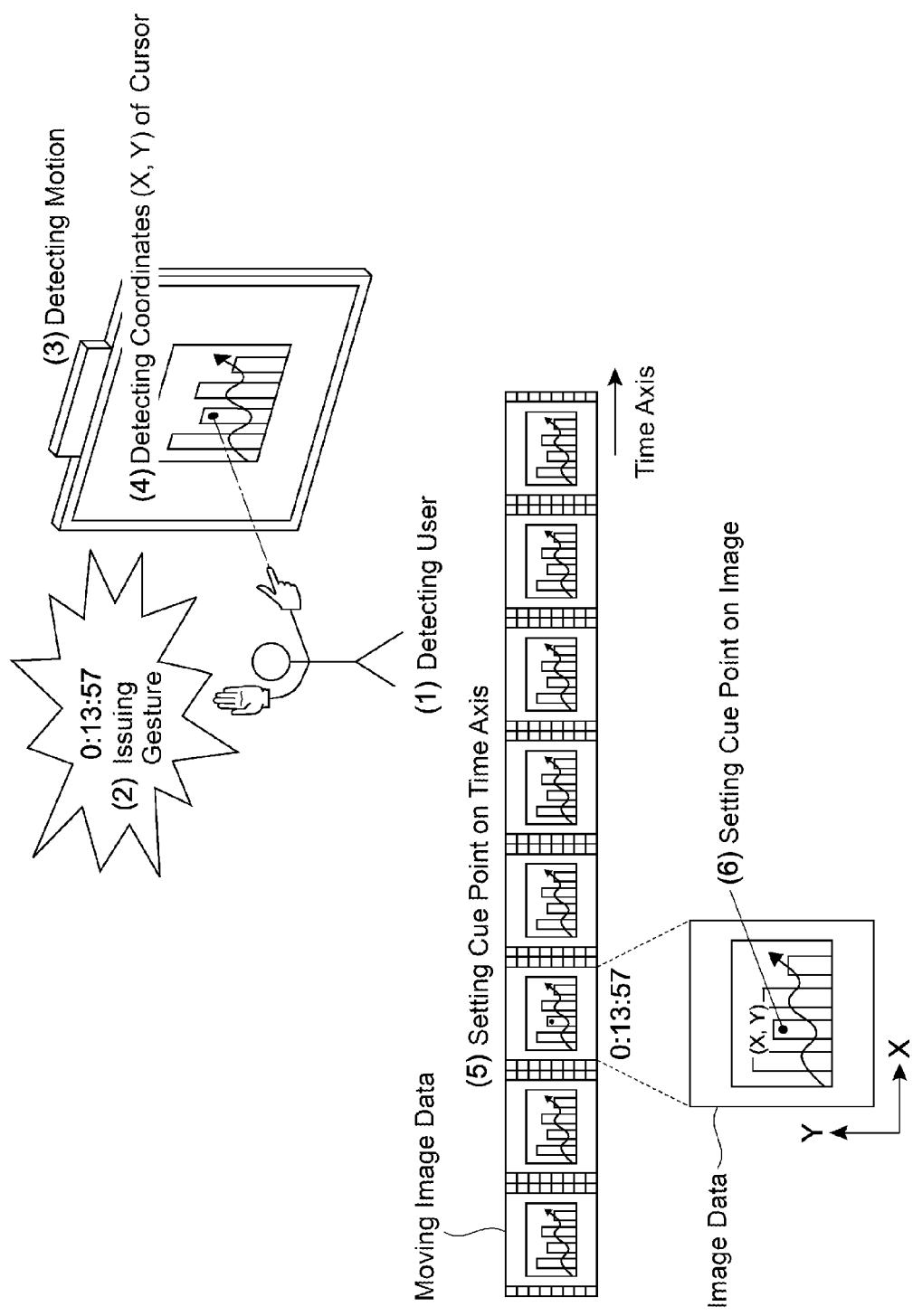
FIG. 5 illustrates a flow of processes for the cue point setting in the cue point control apparatus according to the third embodiment.

Next, a flow of processes for the setting of the temporal cue point and the spatial cue point in the cue point control apparatus 1b according to the third embodiment will be described. FIG. 5 illustrates the flow of the processes for the cue point setting in the cue point control apparatus 1b according to the third embodiment.

(1) First, the motion capture unit 10 detects the user as the speaker for the presentation.

(2) Next, the user makes (issues) a gesture (first motion) for setting the cue point in the moving image during capturing. In an example as illustrated in FIG. 5, the gesture is issued at the time point when an elapsed time after the start of recording is 13 minutes 57 seconds.

(3) Next, the motion capture unit 10 detects the action performed by the user.

(4) Next, the coordinate detecting unit 31 acquires the coordinate at a cursor position on the screen of the display apparatus.

(5) Next, upon detection of the user's action for instructing the cue point setting by the motion capture unit 10, the cue point setting unit 21 sets the temporal cue point in the frame of the moving image stored in the storage device 50 by the video/audio recording apparatus 40 according to theming of the detection. In the example as illustrated in FIG. 5, the temporal cue point is set in the frame at the time point when the elapsed time after the start of recording is 13 minutes 57 seconds.

(6) Next, the cue point setting unit 21 correlates the coordinates (X, Y) passed from the coordinate detecting unit 31 with the temporal cue point set in the previous step, so as to store it as the table in conjunction with the moving image.

Up to this point, the flow of processes for the setting of the temporal cue point and the spatial cue point in the cue point control apparatus 1b according to the third embodiment has been described.

Outline of Fourth Embodiment

Next, an outline of the fourth embodiment will now be described. The cue point control apparatus according to the above-described embodiment sets the cue point in the frame of the moving image being captured. In contrast, the cue point control apparatus according to the fourth embodiment, in addition to the above-described function, can also perform the cue of the moving image using the temporal cue point and the spatial cue point set in the moving image while playing back the moving image where the cue point has already been set.

Up to this point, the outline of the fourth embodiment has been described.

Configuration of Fourth Embodiment

Figure 6:
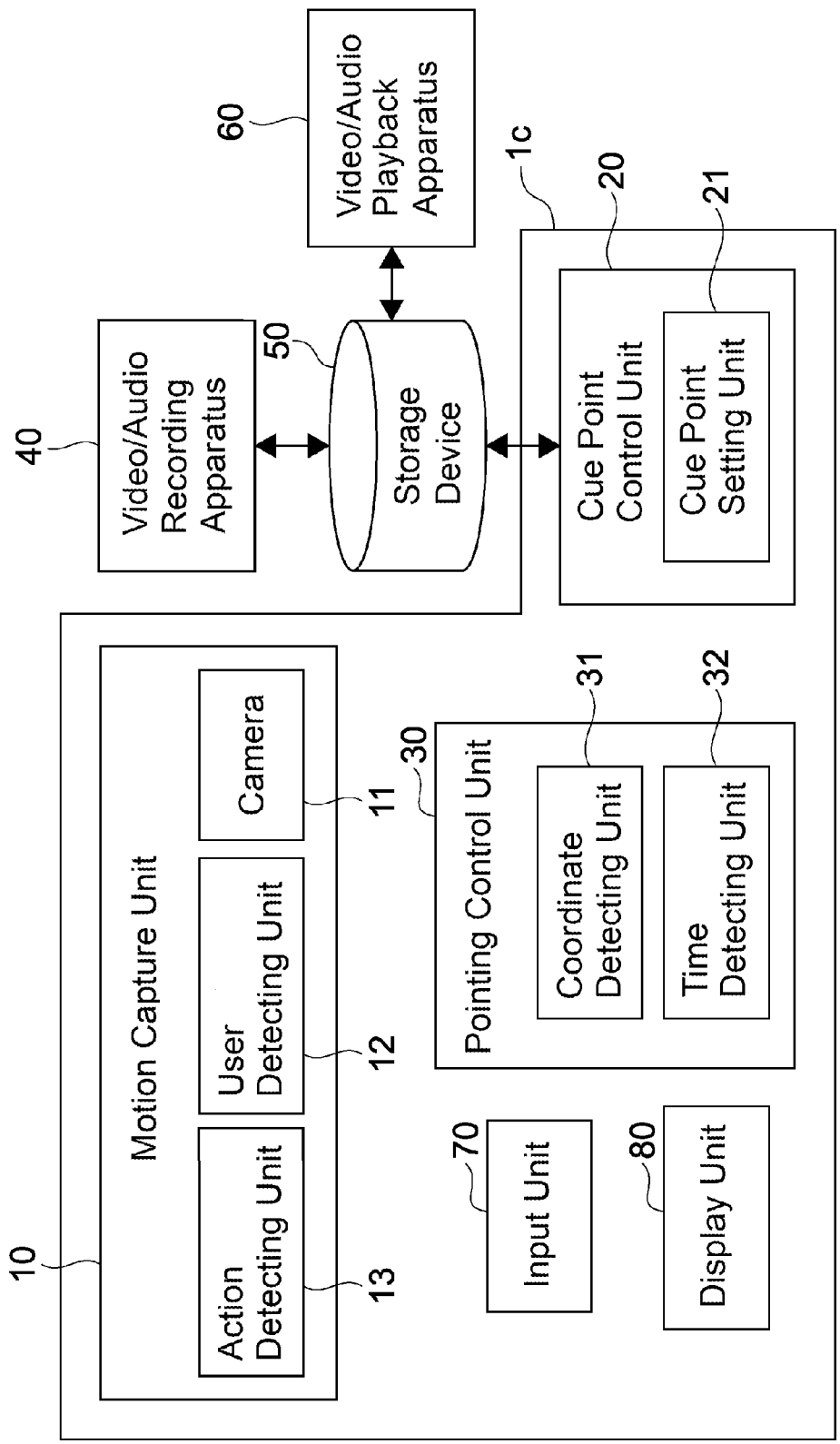
FIG. 6 illustrates a configuration of a cue point control apparatus according to a fourth embodiment of the disclosure.

Next, a configuration of the cue point control apparatus according to the fourth embodiment will be described. FIG. 6 illustrates the configuration of a cue point control apparatus 1c according to the fourth embodiment.

The cue point control apparatus 1c includes the motion capture unit 10, the cue point control unit 20, the pointing control unit 30, an input unit 70, and a display unit 80. The pointing control unit 30, the input unit 70, and the display unit 80 may be an apparatus that is independent of the cue point control apparatus 1c.

In the following description, the only different description from the third embodiment as described above will be provided.

The input unit 70 is, for example, a pointing device such as a computer mouse, a keyboard, a touch panel, or an additional operating device.

The display unit 80 is, for example, a liquid crystal display, an Electro-Luminescence (EL) display, a plasma display, a Cathode Ray Tube (CRT) display, or a similar display. The display unit 80 may be built in the cue point control apparatus 1c and connected externally as well.

As shown from the above-described description, the cue point control apparatus 1c may be constituted with a typical PC.

Up to this point, the configuration of the cue point control apparatus 1c according to the fourth embodiment has been described.

Specification Method of Cue Point in Fourth Embodiment

Figure 7:
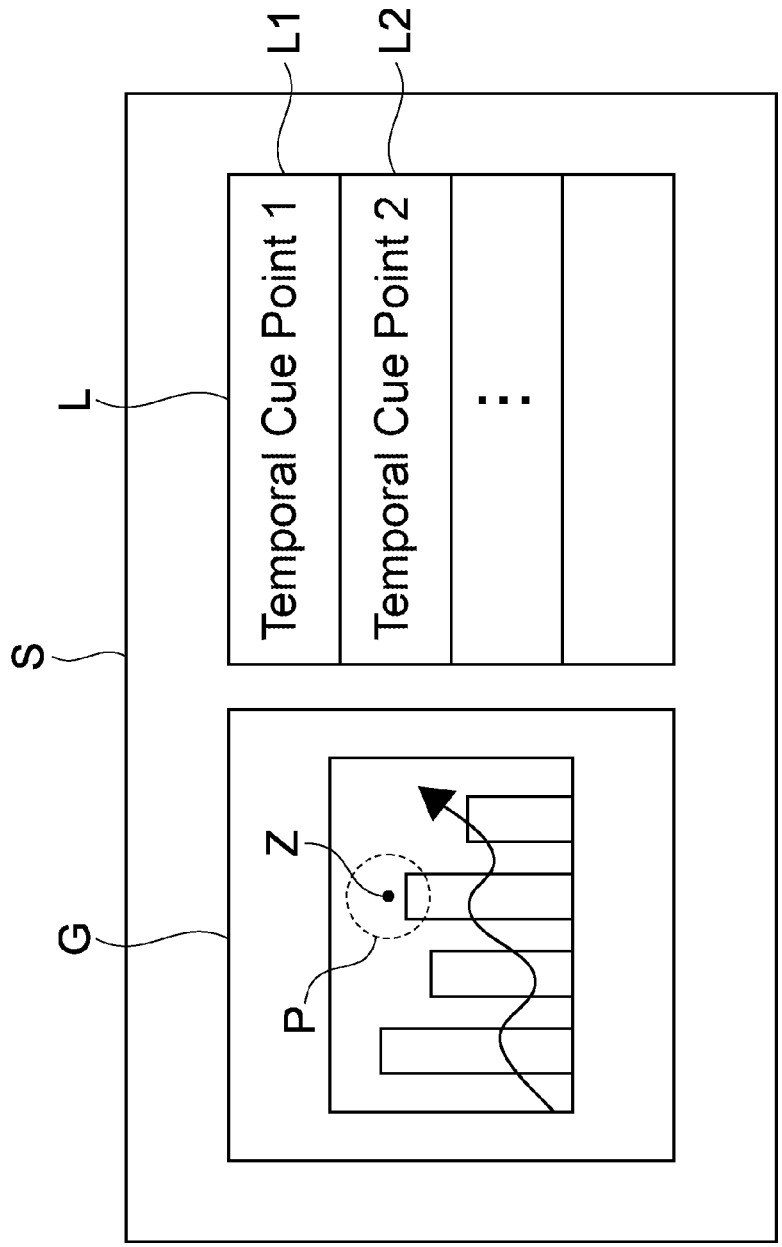
FIG. 7 illustrates a concrete example of a specification method of the cue point in the cue point control apparatus according to the fourth embodiment.

Next, an example of a specification method of the cue point in the cue point control apparatus 1c according to the fourth embodiment will be described. FIG. 7 illustrates the example of the specification method of the cue point in the cue point control apparatus 1c according to the fourth embodiment.

FIG. 7 illustrates an image of a screen S in the display unit 80. In the right side of the screen S, a list L of the temporal cue point is displayed. In the left side of the screen S, a playback screen for the recorded moving image, that is, an image G used for the presentation by the user is displayed.

When the user performs the cue of the moving image using the temporal cue point, the user selects the temporal cue point (such as a temporal cue point 2), in which the user assumes the position desired for the cue to be included, among the list L.

After selecting the temporal cue point, the cue point control unit 20 provides instruction for the cue to the video/audio playback apparatus 60, which causes the cue to be performed.

When the user performs the cue of the moving image using the spatial cue point, the user specifies any position on the image G. In order to specify this, the user remembers the positions, where he or she has pointed during the presentation, to specify the position assumed to have been pointed.

For example, for the cue of the position where the explanation of the sales for the previous year has been given, a part P around the graph of the sales for the previous year is to be specified. Because it is assumed that the user has pointed to the graph of the sales for the previous year when explaining during the presentation.

Since the spatial cue point is stored as a one-point coordinate Z, it is difficult to specify the point Z accurately. Therefore, when the coordinate including the stored coordinate Z within a specified range P is specified, the spatial cue point corresponding to the coordinate Z is assumed to be specified.

Upon specification of the coordinate of the spatial cue point, the cue point control unit 20 searches the table, which is stored in conjunction with the moving image and in which the coordinate and the frame number are correlated, to acquire the frame number required for the cue.

After acquiring the frame number, the cue point control unit 20 provides instruction for the cue to the video/audio playback apparatus 60 (moving image playback apparatus), which causes the cue to be performed.

Up to this point, the example of the specification method of the cue point in the cue point control apparatus 1c according to the fourth embodiment has been described.

Effects of the Disclosure (1) The cue point can be set in the moving image being captured without touching input equipment during the presentation. This eliminates the need for a special device such as a laser pointer.

(2) The cue point may be set at the earlier time point by a specified time than the time when the instruction is provided, during the presentation.

(3) The cue may be performed based on the coordinate pointed during the presentation.

While various aspects and embodiments have been disclosed herein, other aspects and embodiments will be apparent to those skilled in the art. The various aspects and embodiments disclosed herein are for purposes of illustra-

What is claimed is:

1. A cue point control apparatus used for capturing a display apparatus, comprising:
   a control unit that sets a marker while capturing, as a moving image, a presentation performed with displaying an image on a screen of the display apparatus; and
   a motion detecting unit that detects a motion of a user performing the presentation; wherein
   when the control unit determines a set first motion of the user for the marker setting by the detected motion, the control unit sets a temporal marker in a frame of the moving image at a time when determining the first motion during the capturing, and
   when the control unit determines the first motion by the detected motion, the control unit acquires a coordinate of a cursor displayed on the screen and correlates a frame number of the frame of the moving image at the time when determining the first motion during the capturing with the coordinate, so as to record as a spatial marker.

2. The cue point control apparatus according to claim 1, wherein when the control unit determines a set second motion of the user for the marker setting by the detected motion, the control unit sets a temporal marker in a frame of the moving image at an earlier time by a time specified by the second motion than the frame at the time when determining the second motion during the capturing.

3. The cue point control apparatus according to claim 1, further comprising a pointing control unit that extracts a third motion of the user pointing to the screen from the detected motion, and moves the cursor displayed on the screen based on the extraction result.

4. The cue point control apparatus according to claim 1, further comprising:
   a display unit that displays a list of the at least one temporal marker set in the moving image during playback, and the moving image played back, while the captured moving image is played back; and
   an input unit that accepts at least one of: a selection of the temporal marker from the displayed list, and an indication of the coordinate on the displayed image, by the user performing a cue of the moving image; wherein
   the control unit instructs the cue based on the specified marker to a moving image playback apparatus playing back the moving image when the temporal marker is specified, and
   the control unit searches the spatial marker correlated with the coordinate contained in a specified range containing the specified coordinate and instructs the cue based on the searched marker to the moving image playback apparatus playing back the moving image when the coordinate is specified.

5. A cue point control apparatus used for capturing a display apparatus, comprising:
   a control unit that sets a marker while capturing, as a moving image, a presentation performed with displaying an image on a screen of the display apparatus; and
   an input unit that accepts an instruction for the marker setting by a user; wherein
   when the control unit accepts the instruction, the control unit acquires a coordinate of a cursor displayed on the screen and correlates a frame number of the frame of the moving image at the time when accepting the instruction during the capturing with the coordinate, so as to record as a spatial marker.

6. The cue point control apparatus according to claim 5, further comprising:
   a display unit that displays the moving image while the captured moving image is played back; and
   an input unit that accepts an indication of the coordinate on the displayed image by the user performing a cue of the moving image; wherein
   the control unit searches the spatial marker correlated with the coordinate contained in a specified range containing the specified coordinate and instructs the cue based on the searched marker to the moving image playback apparatus playing back the moving image when the coordinate is specified.

7. A non-transitory computer-readable recording medium storing a cue point control program to control a cue point control apparatus, the cue point control program causing the cue point control apparatus to function as:
   a control unit that sets a marker while capturing, as a moving image, a presentation performed with displaying an image on a screen of the display apparatus; and
   an input unit that accepts an instruction for the marker setting by a user; wherein
   when the control unit accepts the instruction, the control unit acquires a coordinate of a cursor displayed on the screen and correlates a frame number of the frame of the moving image at the time when accepting the instruction during the capturing with the coordinate, so as to record as a spatial marker.

8. The non-transitory computer-readable recording medium according to claim 7, wherein when the user performing a cue of the moving image specifies the coordinate on the displayed image while the captured moving image is played back, the control unit searches the spatial marker correlated with the coordinate contained in a specified range containing the specified coordinate, and instructs the cue based on the searched marker to the moving image playback apparatus playing back the moving image.

* * * * *